United States Patent
Hämäläinen et al.

(10) Patent No.: US 7,336,630 B2
(45) Date of Patent: *Feb. 26, 2008

(54) SIMULTANEOUS TRANSMISSION OF SPEECH AND DATA ON A MOBILE COMMUNICATIONS SYSTEM

(75) Inventors: Jari Hämäläinen, Tampere (FI); Janne Jormalainen, Tampere (FI)

(73) Assignee: Spyder Navigations L.L.C., Wilmington, DE (US)

( * ) Notice: Subject to any disclaimer, the term of this patent is extended or adjusted under 35 U.S.C. 154(b) by 897 days.

This patent is subject to a terminal disclaimer.

(21) Appl. No.: 10/242,533

(22) Filed: Sep. 12, 2002

(65) Prior Publication Data

US 2003/0016643 A1 Jan. 23, 2003

Related U.S. Application Data

(63) Continuation of application No. 08/809,241, filed on Jun. 2, 1997, now Pat. No. 6,477,176.

(30) Foreign Application Priority Data

Sep. 20, 1994 (FI) ..................... 944352

(51) Int. Cl.
*H04J 3/00* (2006.01)
*H04B 7/00* (2006.01)
*H04L 12/66* (2006.01)

(52) U.S. Cl. ............ 370/329; 370/341; 370/352; 370/468; 370/493

(58) Field of Classification Search ............ None
See application file for complete search history.

(56) References Cited

U.S. PATENT DOCUMENTS

| | | | |
|---|---|---|---|
| 4,488,287 A | 12/1984 | Carter et al. ............ | 370/58 |
| 4,578,789 A | 3/1986 | Middleton et al. ......... | 370/58 |
| 4,589,107 A | 5/1986 | Middleton et al. ......... | 370/62 |
| 5,136,586 A | 8/1992 | Greenblatt ............ | 370/110.4 |
| 5,237,570 A | 8/1993 | Smolinske et al. ........ | 370/95.1 |
| 5,257,257 A | 10/1993 | Chen et al. ............ | 370/18 |
| 5,365,576 A | 11/1994 | Tsumura et al. .......... | 379/93 |
| 5,440,585 A | 8/1995 | Partridge, III .......... | 375/261 |
| 5,511,072 A | 4/1996 | Delprat ............... | 370/336 |
| 5,819,218 A | 10/1998 | Hayata et al. .......... | 704/233 |
| 5,878,120 A | 3/1999 | O'Mahony ............. | 370/433 |

FOREIGN PATENT DOCUMENTS

| | | |
|---|---|---|
| EP | 0 501 485 | 9/1992 |
| EP | 0 521 610 | 1/1993 |
| EP | 0 571 104 | 11/1993 |
| FR | 2 406 920 | 10/1978 |
| GB | 2 274 042 | 7/1994 |
| WO | WO 91/02436 | 2/1991 |

*Primary Examiner*—Chi Pham
*Assistant Examiner*—Soon D. Hyun
(74) *Attorney, Agent, or Firm*—Connolly Bove Lodge & Hutz LLP

(57) ABSTRACT

A method for transmitting speech and data simultaneously on a circuit switched two-way connection of a mobile communications system, which transfers speech and other data by use of discontinuous transmission, DTX, in which the sending is discontinued when it is indicated, that there is no information to be sent, and continued when it is indicated that there is information to be sent. In accordance with the method of the invention, the data to be sent are stored in buffer means and wait to be sent. When it is indicated, that there is no more information to be sent, the data stored in buffer means are sent until there is no more data to be sent or until it is indicated that there is information, speech or other data, to be sent, in which case the sending of data is discontinued and the sending of speech or other data is re-started. So the transfer of data takes place as a background process during transfer of speech or other data. The data are arranged into frame structures while being stored in the buffer. The data are separated, for example, by identifiers placed at the beginning of the frame structures. The same traffic channel can be used for transferring both data and speech or other data. An alternative is to transfer the data on a fast associated control channel that belongs to the same circuit switched connection as the traffic channel.

14 Claims, 5 Drawing Sheets

VAD = VOICE ACTIVITY DETECTOR

SP-ID = SPEECH IDENTIFICATION
D-ID = DATA IDENTIFICATION
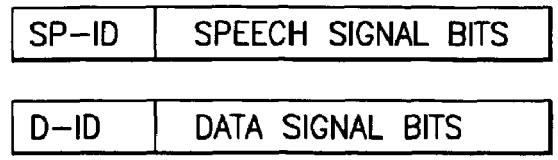
FIG.3

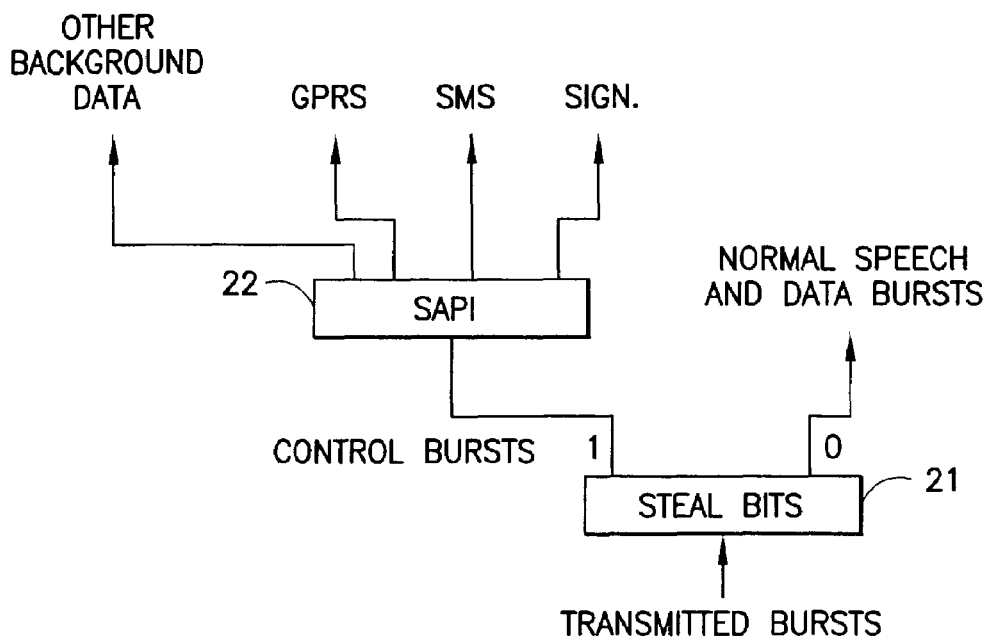
GPRS = GENERAL PACKET RADIO SERVICE
SAPI = SERVICE POINT ACCESS ID
FIG.6
| TB 3 | INFORMATION BITS 57 | SB 1 | TRAINING SEQUENCE | SB 1 | INFORMATION BITS 57 | TB 3 |
|---|---|---|---|---|---|---|
FIG.7

GPRS = GENERAL PACKET RADIO SERVICE
MSC = MOBILE SWITCHING CENTER
BSC = BASE STATION CONTROLLER
BTS = BASE TRANSCEIVER STATION
BS = BASE STATION

SIMULTANEOUS TRANSMISSION OF SPEECH AND DATA ON A MOBILE COMMUNICATIONS SYSTEM

CROSS-REFERENCE TO RELATED APPLICATIONS

This application is a continuation based on parent application U.S. Ser. No. 08/809,241, filed Jun. 2, 1997, now U.S. Pat. No. 6,477,176 now allowed, and for which priority is hereby claimed.

BACKGROUND OF THE INVENTION

1. Field of the Invention

The invention relates to simultaneous transmission of speech and data on a mobile communications system, and it is aimed specifically at the simultaneous transmission of speech and data on a wireless circuit switched channel.

2. Description of the Prior Art

The latest mobile communications systems, like, for example, the European GSM system, are able to offer the users excellent facilities for data transfer, thus enabling the use of different data services by using the terminals of the mobile communications system. The closest prior art in regard to the invention is presented, for example, by the bearer services defined in the GSM system specifications. These bearer services offer the users the opportunity to switch between speech and data transfer, and the services have been defined as both transparent and non-transparent. The implementation of these services, however, is based on the system having separate speech and data modes for the whole transmission chain, and changing between the two modes requires exchanging several signaling messages, which is time-consuming. For example, to change from speech transfer to transferring a fax requires the sender to take the initiative by entering an appropriate command. After this, the change to the data transfer mode is signaled throughout the line, and the acknowledgment of the change is signaled back to the initiating end of the line. After this the data transfer can start. Also the transmission paths for the speech and data signals are different.

In addition, with the GSM system, a new packet data transfer service is being defined. The abbreviation for the service is GPRS (General Packet Radio Service). GPRS data is designed to be transferred by using its own channel, which is new in the system and uses a specific GPRS access control algorithm. It is also required that the new system should be able to carry GPRS data simultaneously with circuit switched data (speech, faxes or other circuit switched data) being carried on another channel. The current terminal devices have not been designed for transferring radio data simultaneously on two channels, that is, for transferring circuit switched data on a TCH channel and packet data on a GPRS channel, and that is why it is difficult to fulfill these requirements.

One clear disadvantage in the operation of the GSM system is the inefficient use of a circuit switched channel capacity. Studies show that, for example, the average activity for speech connection is 44%. So, 56% of the capacity of the circuit switched channel reserved for this purpose remains for other uses, which is mostly idle traffic. As the persons skilled in the art know, it is just this inefficient use of channel resources that has resulted in the development of the DTX function for the most recent mobile communications systems. DTX, that is, discontinuous transmission, which is used in the transmission direction, works in a way that the transmission is discontinued when there is no information, normally speech, to be sent. This function has been developed mainly for saving power. However, the circuit switched connection, that is, the traffic channel between the mobile station and the base station, remains reserved for this purpose, for example, because the receiving end must be active on this channel continuously, as there is no way of knowing when the transmission continues. The operation of the DTX will be further discussed in a description of one of the embodiments of the invention.

According to studies, in mobile communications systems the active use of a circuit switched connection in data transfer takes place in bursts even more so than in speech transfer. So the activity percentage in the transmission of data files is about 29%, and even lower in interactive data transfer, about 3.6%.

OBJECT OF THE INVENTION

The object of the invention is to provide a solution for enhancing the use of circuit switched connection resources and to offer users a simple data transfer service by using a circuit switched connection simultaneously for both speech and data transfer. The basic idea of the invention is to carry out the data transfer simultaneously with the speech transfer as a transparent background process by using the existing channel resources of the circuit switched connection.

SUMMARY OF THE INVENTION

In a preferred embodiment of the invention, the data are sent on the traffic channel of the circuit switched connection during the breaks, which take place during the transmission of speech by using DTX. In principle, this form can be implemented in any mobile communications system, which uses discontinuous transmission. In another, corresponding embodiment of the invention, the data are sent primarily during the breaks in the transmission of speech related to the DTX, by using channel resources other than the traffic channel resources of the circuit switched connection, which has been formed mainly for transferring speech. Primarily, this other kind of channel resource is the control channel that is associated with, or displaces, the traffic channel, like the FACCH (Fast Associated Control Channel) of the GSM system.

The preferred implementation of the generally applicable form of the invention is sending speech and data in separate frames, of which at least the data frames and then preferably the appropriate multiframe structures used in the system are provided with an identifier indicating that the frame contains data. Additionally, the corresponding multiframe structures containing speech frames can include a corresponding identifier indicating that the frames contain speech information. The said multiframe structures can be, and preferably are, similar in other respects.

In another embodiment of the invention, both the terminal equipment and the network side of the mobile communications system have a data buffer, to which the data to be sent is stored while waiting for an opportunity to transmit it. The same buffer can be used to temporarily store received data frames when converting the data from the form used in transfer to the form required by the receiving device or part of the terminal equipment. The transmission control means, especially, are provided with functions for controlling the operation of the data buffer. According to the preferred implementation, the data is stored in the buffer after it has already been arranged in the frames required by the protocol used for the transfer.

The invention can also be used to multiplex some other data connection to a circuit switched data connection.

BRIEF DESCRIPTION OF THE DRAWINGS

In the following, the invention is described further, and references are made to the figures included, of which:

FIG. 3 is a schematic presentation of a speech and data frame structure that can be used in a generally applicable form of the invention, FIG. 6 illustrates the operation according to the invention in an exemplary mobile communications system, in which an associated control channel of a circuit switched channel is used to transfer the background data FIG. 7 shows an example of a frame structure, which contains the flags that separate the control and background bursts from the normal speech and data bursts.

DETAILED DESCRIPTION OF THE PREFERRED EMBODIMENT(S)

In the following, with reference to FIG. 1, the discontinuous transmission, DTX, and the operation of the mobile communications system terminal in the transmission direction, in accordance with the invention, are examined in more detail. The operation of the terminal in the receiving direction is illustrated by the corresponding block diagram in FIG. 2. The descriptions of the control of transmission and receiving and the data buffering are also true for the corresponding operations in the network side. The purpose of DTX is to save power and in that way to prolong the battery life, and, primarily, to reduce the interference between radio channels. Even if some breaks produced by DTX are used in some connections to transfer data, the average interference level of the system does not increase dramatically.

Figure 1:
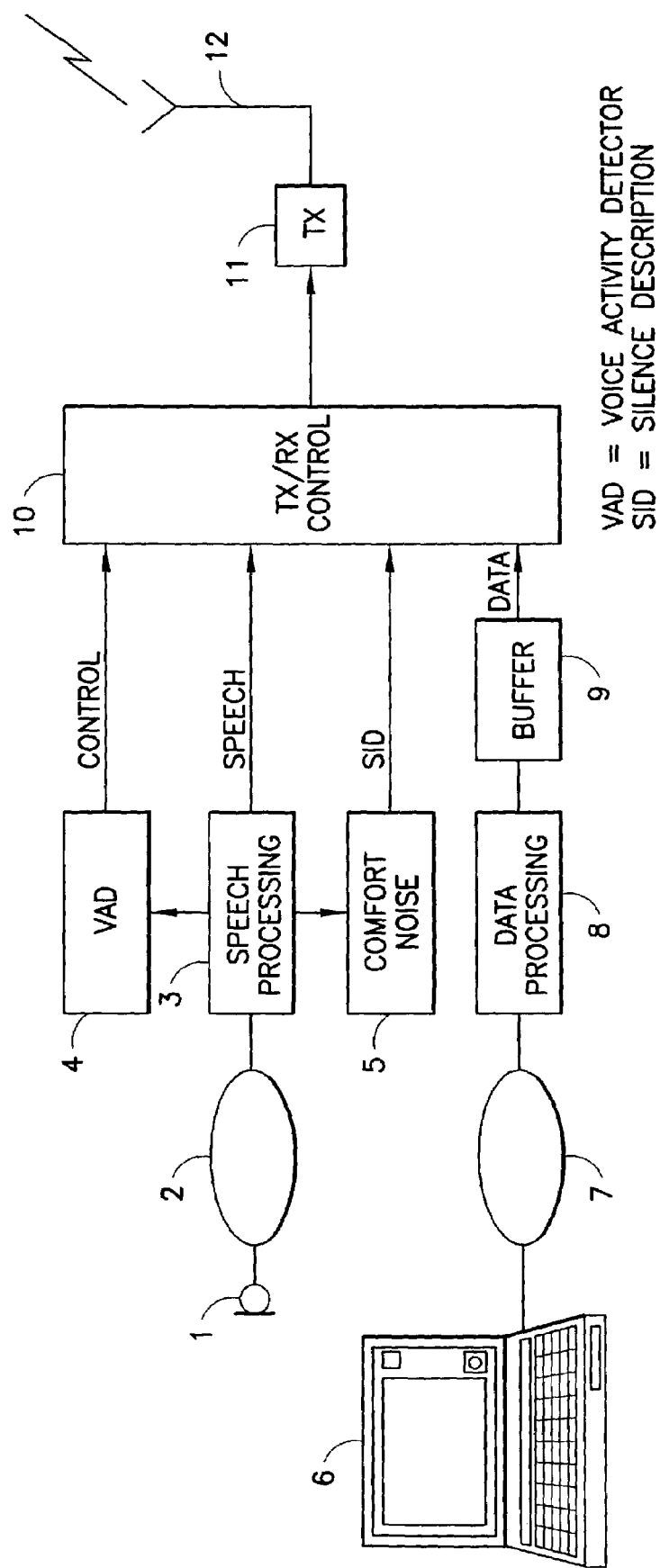
FIG. 1 shows, as a block diagram, the operation of a mobile communications system terminal in the transmission direction in accordance with the invention.

In the terminal of FIG. 1, the microphone 1 and the speech parts 2 deliver the speech signals, which are further processed in the speech processing circuits 3, from which the speech frames go to the transmission controller 10, which directs them further via the transmitter 11 and the antenna 12 to the radio channel. Connected with the terminal or in the terminal itself, there can also be data processing parts, for example, a computer 6 connected with the terminal, data parts 7 belonging to it, data processing circuits 8, and, especially in the implementation in accordance with the invention, a data buffer 9, to which the data, in the form of frames ready to be transmitted, is saved temporarily to wait for an opportunity to send them. The controller 10 directs the data frames further via the transmitter and the antenna to the radio channel. Additionally, the terminal has, especially for DTX, a voice activity detector (VAD) 4 and a comfort noise generator 5. The purpose of the voice activity detector 4 is to indicate the end of a speech burst. In DTX the terminal sends a few noise frames and, if necessary, a silence description (SID) frame before the transmission is discontinued. A SID frame is only sent, if too much time has passed since the last sending of a SID frame. The purpose of the comfort noise generator is to produce, in the receiving end, pleasant background noise instead of unpleasant silence. The purpose of sending SID frames is to produce, at the receiving end, a filter, which produces, by use of a random impulse, the same kind of noise that can be heard in the transmitting end. When the transmitter works in accordance with the invention, the controller 10 does not break the transmission immediately after sending comfort noise frames or a SID frame, but instead of that checks to verify whether there are any data frames to be sent in the data buffer 9 and, if there are any, directs these frames, which have already been sorted into the sending order, to the transmitter 11. The sending of data frames can continue until VAD 4 informs of a new speech burst and the transmission is discontinued, as the speech transfer, which does not tolerate delays, has the priority in this embodiment of the invention.

Figure 2:
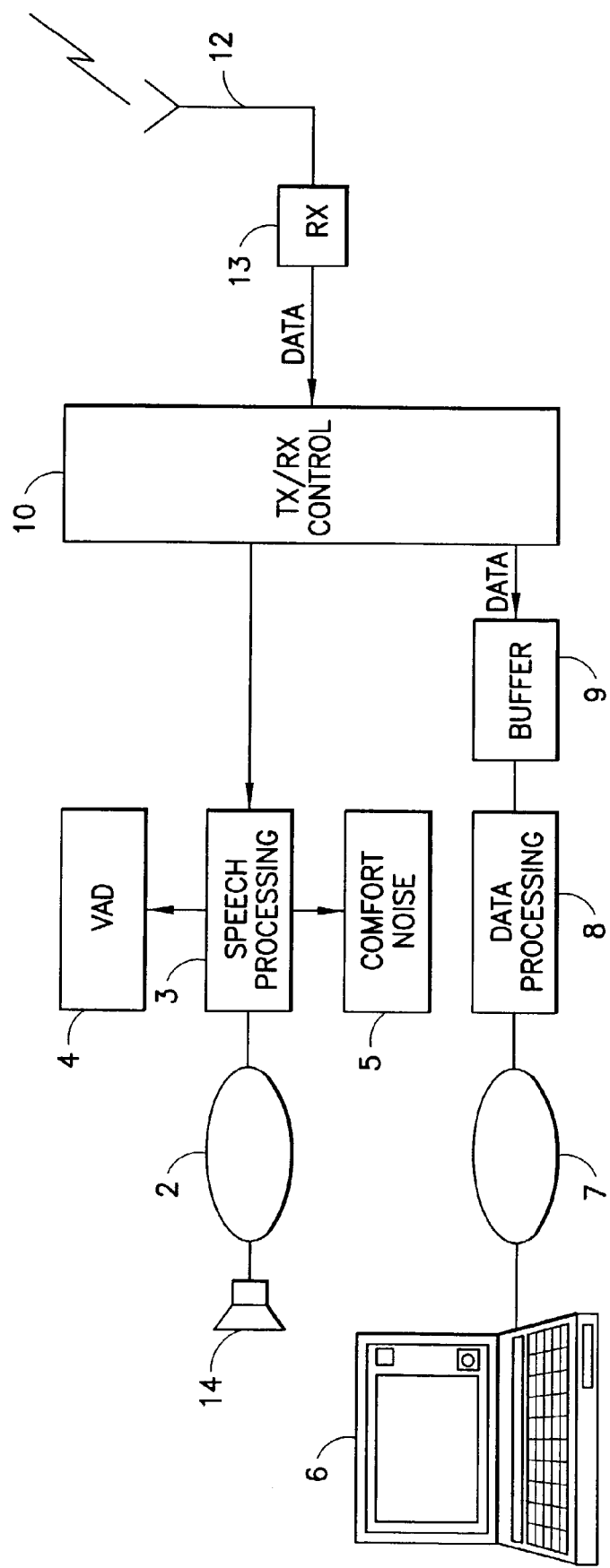
FIG. 2 shows, as a block diagram, the operation of a mobile communications system terminal in the receiving direction in accordance with the invention.

FIG. 2 presents the operation of the mobile communications system terminal in the transmission direction, in accordance with the invention. In this case, the receiving controller 10 directs the incoming speech and SID frames to the speech processing circuits 3 and data frames to the data buffer 9. The frames that are directed to the speech processing circuits are processed normally, and the data frames are directed from the data buffer 9 to the data processing circuits 8, and further, for example, to the computer 6 connected to the terminal.

Figure 4:
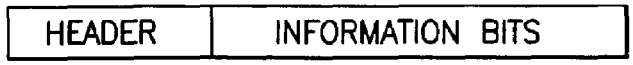
FIG. 4 is a schematic presentation of a frame structure, which can be used when communicating by using a circuit switched connection in accordance with the invention, and which contains a header that defines the frame contents more accurately.

FIG. 3 presents, in a diagram form, one possible way to separate the speech and data frame structures from one another. At the beginning of a multiframe containing speech or data frames there is a corresponding ID, Sp-ID or D-ID, which may consist of only one bit, if it is necessary only to state whether the information is speech or data. If it is necessary to define, for example, what kind of data is in question, or if the data to be sent is to be transferred later via a packet data system, for example GPRS, a header defining the information contained in the frame can be used at the beginning of the frame structure as shown in FIG. 4. The header may contain, for example, 4 bits, and it can define the contents of the frame in the following way:

| Header | Frame contents |
|--------|----------------|
| 1000   | Speech service 1 |
| 1001   | Speech service 2 |
| ...    |                |
| 0000   | Signaling data |
| 0001   | SMS data |
| 0010   | GPRS packet data |
| 0011   | Background data 1 |
| 0100   | Background data 2 |

When considering the aspects described above, in relation to FIGS. 1, 2, 3 and 4, it should be noted that a circuit switched connection can be used, instead of using it for the speech service, also for normal data service specified in the system. This was referred to already in the general part of the description. In this case, the traffic channel is used to transfer data frames related to this service instead of speech frames.

The operation differs from the one described above in the respect that instead of the speech processing parts 1, 2, 3, 4, 5 and 14, the corresponding data processing parts are connected to the transmission and receiving control. Discontinuous transmission works during normal data transfer in the same way as during speech transfer, and enables operation in accordance with the invention. Only in this case the same circuit switched connection is used simultaneously for several data services instead of using it to transfer speech and data simultaneously.

Figure 5:
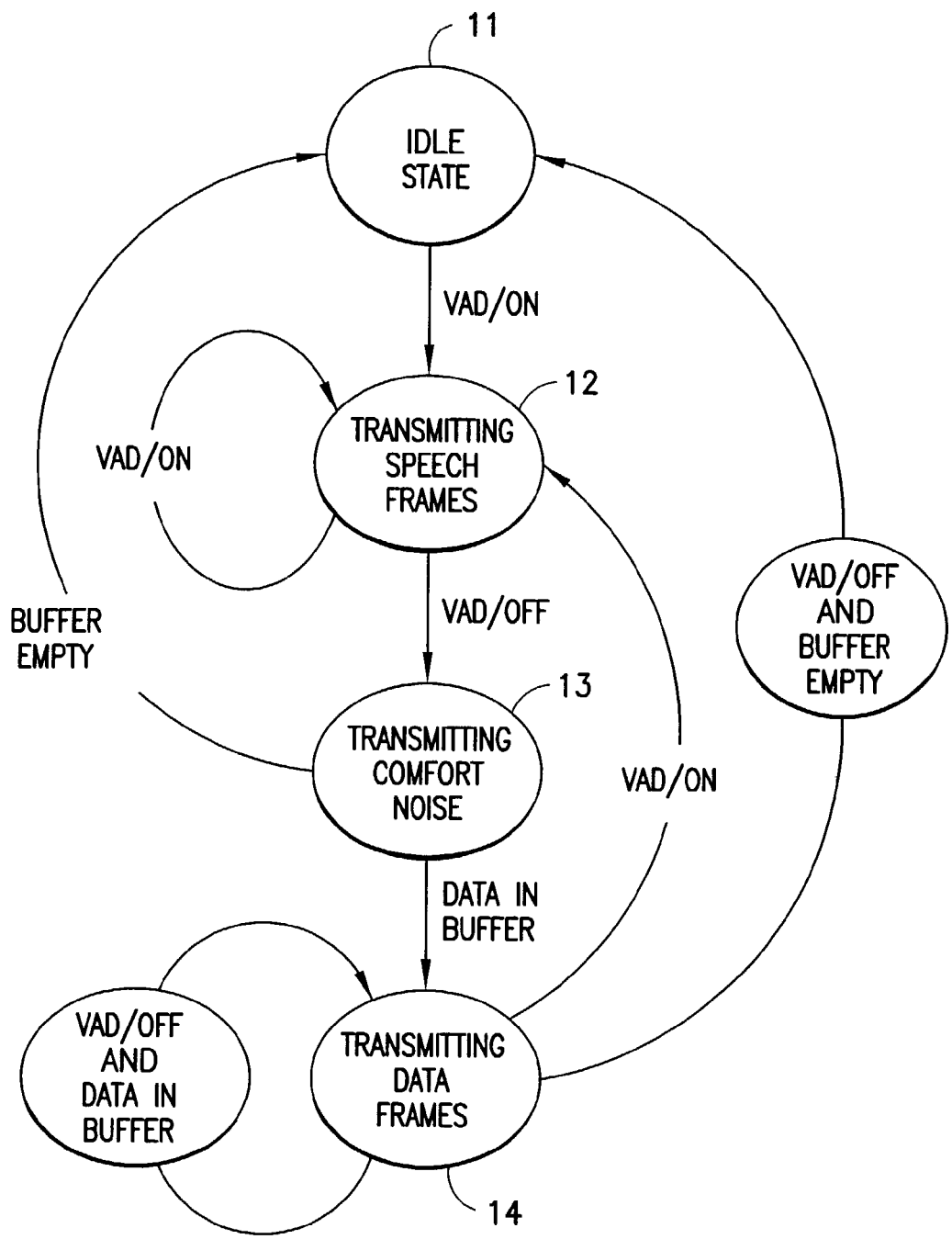
FIG. 5 illustrates, in the form of a state machine diagram, one possible implementation of the transmission control in accordance with the invention.

The state machine diagram of FIG. 5 describes in more detail the operation of the transmission control in the mobile communications system terminal, in accordance with the invention. In state 12, speech frames are sent. As long as the voice activity detector indicates that there is speech information, that is, the condition VAD/ON is true, the sending of speech frames continues. When there is no more speech information, that is, condition VAD/OFF is true, a few frames of comfort noise are sent in accordance with block 13, and, if necessary, a SID frame is sent, and the data buffer is checked to see whether there are data, otherwise known as secondary data, to be sent. If there are no data, the terminal enters idle state 11. If there are data in the buffer, the terminal enters state 14 to send the data. Data are sent as long as VAD/OFF is true and there are data in the buffer. If there are no more data in the buffer and VAD/OFF is still true, the terminal enters the idle state. If it is indicated that the speech has started again, that is, the condition VAD/ON is true, state 12 is re-entered to send speech frames. The same is done if the condition VAD/ON becomes true when the terminal is in idle state.

On the basis of the description, it is easy to see what kind of changes are required in the mobile communications system terminal and the corresponding parts of the network to introduce operation based on the invention. The transmission control must be changed, in accordance with the state machine diagram presented above, to control the data frame transfer taking place as a background process on a circuit switched connection intended primarily for transfer of speech. For this purpose, a data buffer is required, in which the data frames are sorted in frame structures ready for transmission and in which the frame structures are stored until they can be sent. The receiving control separates the speech and data frames from one another, and the speech frames are processed in the normal way. For the receiving of data, there is a data buffer corresponding to the transmission buffer, and preferably these buffers are combined together. The received data frames are directed to the buffer in order to deliver them further to be processed and converted to the format required by the terminal or the data devices connected to the terminal. As was described earlier with reference to FIG. 1, the data buffer is connected to the data terminal or other data devices connected with the terminal, to the transmission and receiving control, and, if necessary, to the circuit switched connection and its relevant channel under the transmission and receiving control. On the network side, the corresponding data buffer is connected to the corresponding transmission and receiving control and, if necessary, to the circuit switched connection and its relevant channel under the transmission and receiving control, and to a data server or a corresponding device, like a GPRS server that is described later. If the buffer fills up, flow control can be used, both on the terminal and network side, between the buffer and the data device or, respectively, between the buffer and the data server. Implementing data transfer as a background process in a mobile communications system in accordance with the invention requires also that this new service and its operation are specified in the system.

New mobile communications networks, like GSM, DCS 1800 and DCS 1900, can be modified to support simultaneous speech and data transfer, in which the data transfer takes place as a background process. With circuit switched connections, fewer changes than what was described above are required. The data to be transferred may be packet data to be transferred by use of a radio link, for example, GPRS, which was referred to in the general part of the description, or other data to be transferred in the background. In this way, also packet data could be sent during the sending breaks in DTX as a simultaneous circuit switched connection and packet connection data transfer without a specific GPRS channel.

The data can be buffered in the mobile communications terminal and, respectively, in the network before being sent. As soon as a period of silence begins in the DTX, the sending of data as a background process is started. The data is sent on a so-called fast associated control channel, FACCH, which can be separated by use of so-called steal bits in the normal bursts of a GSM interface. FIG. 7 shows this kind of normal burst, which has one steal bit SB on both sides of the training period. When these bits are set to 1, the terminal and base station know that the incoming bursts contain data.

FIG. 6 shows one alternative of separating speech and data. Data can be signaling data, short message data, packet data or other background data. If the steal bits are set to 0, the bursts transferred on the traffic channel of the circuit switched connection contain speech frames or data frames of the normal data service used in the system. If the steal bits are set to 1, the data in question is signaling data, or data transferred as a background process and on a fast associated control channel. The service access point identifier (SAPI), which selects the service access, defines the data type in question. The defining can be done by use of a header, as explained with reference to FIG. 4. After this, it is known at the system level which data processing path to follow.

The described operating method of the invention differs from, for example, the current operating method of the GSM system. The difference is that now the fast associated control channel FACCH, which is separated by use of steal bits, is not used only to send control and signaling data, so that, when there is a need for signaling, the control channel displaces the traffic channel and is in use until all necessary control data has been sent. Instead, the control channel is used in association to the traffic channel to actively transfer data other than control data. The preferred operating method is, in accordance with the basic idea of the invention, such that the FACCH is used for sending data during the breaks in discontinuous transmission that take place on the traffic channel. This operating method can be extended to cover also the control data, so that, the control data remains, for example, at the base station until there is a suitable break in the traffic channel. On the other hand, it is possible to give some amount of priority to the data transfer on the control channel, for example, by arranging suitable breaks in the transfer on the traffic channel. This can be done, for example, by decreasing the quality of speech that is transferred on the traffic channel.

Figure 8B:
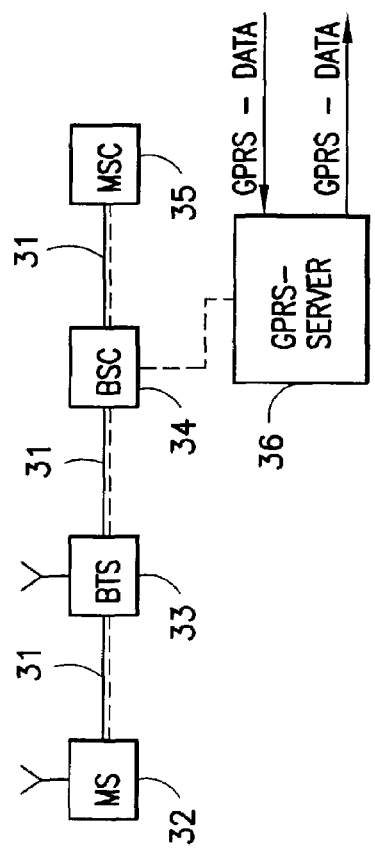
FIGS. 8(a), 8(b) and 8(c) present multiplexing of data from a packet data system to a circuit switched connection, and the alternative network elements in which the multiplexing can be carried out.
Figure 8A:
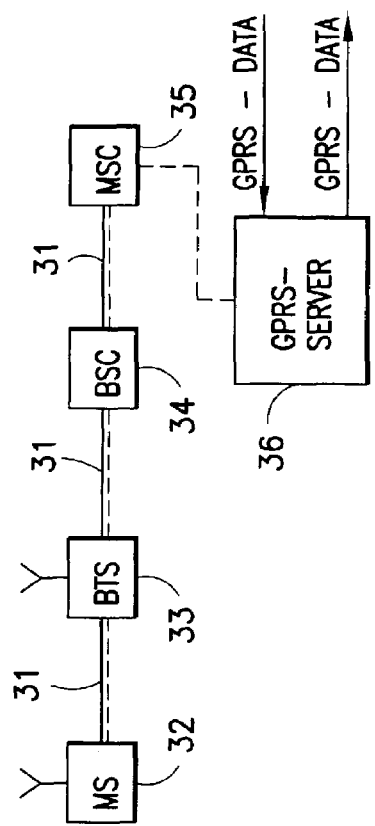
Figure 8C:
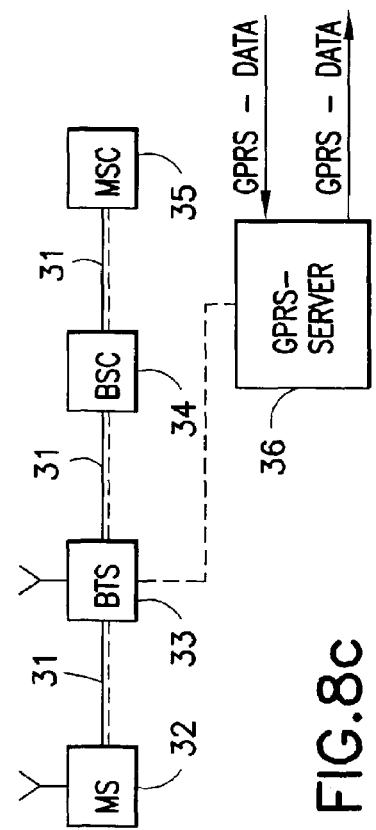

Sending data frames on the control channel is done by using the normal GSM signaling procedure, like $LAPD_m$ in the radio interface and LAPD in the Abis interface between the base station and the base station controller. On the network side, the background data can be inserted to the FACCH frames of the DTX inactivity period in mobile switching center MSC, base station controller BSC or base transceiver station BTS. A prerequisite to this is the ability of the network element, in which the data is inserted to the frames, to connect the system terminal, which is sending data on a circuit switched connection, to the background data. In other words, it must know which channel the terminal in question uses for transferring circuit switched data, so that, it can connect the incoming or outgoing data of the terminal to the same physical channel by using the FACCH channel as the logical channel. FIG. 8 presents the above-mentioned alternatives in a case, in which GPRS packet data are multiplexed to a circuit switched connection 31 and in which the network has GPRS servers 36 for the GPRS service. In FIG. 6(*a*) the network element taking care of the multiplexing is the mobile switching center 35, in FIG. 6(*b*) the base station controller 34, and in FIG. 6(*c*) the base station 32.

Examples of the general implementation of the invention in a digital mobile communications system and specific implementation in one system, GSM, have been described above. Naturally, the possible applications of the invention are not limited to these examples. The invention can be varied within the scope defined by the following claims.

What is claimed is:

1. A method of transmitting secondary data alternating with speech or primary data on a circuit-switched connection of a mobile communications system, said mobile communications system using discontinuous transmission to transfer speech or primary data in frames, so that transmission of speech or primary data is discontinued when it is indicated that there is no speech or primary data to be transmitted and continued when it is indicated that there is speech or primary data to be transmitted, said method comprising:
   transmitting speech or primary data;
   storing secondary data in buffer means;
   discontinuing the transmission of speech or primary data frames for a certain time interval, thus causing a decrease in the quality of the transmitted speech or primary data, and transmitting secondary data stored in the buffer means until the end of said certain time interval;
   discontinuing the transmission of secondary data at the end of said certain time interval and re-starting the transmission of speech or primary data;
   when it is indicated that there is no speech or primary data to be transmitted, transmitting secondary data stored in the buffer means until there are no more secondary data to be transmitted or until it is indicated that there is speech or primary data to be transmitted; and
   using in each frame an identifier to indicate whether the frame contains speech or primary data, or whether the frame contains secondary data.

2. A method in accordance with claim 1, wherein speech and primary data are transferred on a traffic channel of a circuit switched connection, and the data is transferred on a fast associated control channel that belongs to the same circuit switched connection and is provided for transferring control data.

3. A method in accordance with claim 2, wherein the method steps used for transferring secondary data are also used for transferring control data.

4. A method in accordance with claim 1, wherein the secondary data are stored in the buffer means in frame structures in accordance with a transfer protocol used in their transmission.

5. A method in accordance with claim 1, wherein the frame structures further comprise:
   a fixed frame length containing secondary data, and
   a header, which indicates the type of data contained in the frame structure, wherein the header comprises a predetermined special character for indicating the type of data contained in the frame structure.

6. A method in accordance with claim 1, wherein the secondary data is transferred on a traffic channel belonging to a circuit switched connection and provided for transfer of speech or primary data.

7. A method of transmitting secondary data alternating with speech or primary data on a circuit switched connection of a mobile communications system, which system uses discontinuous transmission to transfer speech or primary data in frames, so that the transmission of speech or primary data is discontinued when it is indicated that there is no speech or primary data to be transmitted and continued when it is indicated that there is speech or primary data to be transmitted, said method comprising:
   transmitting speech or primary data, wherein speech or primary data are transferred on a traffic channel of a circuit switched connection, and wherein the secondary data is transferred on a fast associated control channel that belongs to the same circuit switched connection and is provided for transferring control data;
   storing secondary data in buffer means;
   discontinuing the transmission of speech or primary data for a certain time interval, thus causing a decrease in quality of transmitted speech or primary data, and transmitting secondary data stored in the buffer means until the end of said certain time interval;
   discontinuing the transmission of secondary data and re-starting the transmission of speech or primary data;
   when it is indicated that there is no speech or primary data to be transmitted, transmitting secondary data stored in the buffer means until there are no more secondary data to be transmitted or until it is indicated that there is speech or primary data to be transmitted; and
   using in each frame an identifier to indicate whether the frame contains speech or primary data, or whether the frame contains secondary data.

8. A method in accordance with claim 7, wherein the method steps used for transferring secondary data are also used for transferring control data.

9. A method in accordance with claim 7, wherein the secondary data is packet data to be transferred further via a packet data system.

10. A terminal device for transmitting secondary data alternating with speech or primary data on a circuit switched connection of a mobile communications system, wherein the terminal device includes:
   means for discontinuous transmission of speech or primary data in frames, to continue of discontinuing the transmission of speech or primary data when it is indicated that there is no speech or primary data to be transmitted and continuing the transmission of speech or primary data when it is indicated that there is speech or primary data to be transmitted, and further comprising:
   buffer means for temporarily storing secondary data to be transmitted;
   means for transmitting secondary data in frames during the intervals when the transmission of speech or primary data is discontinued;
   means for discontinuing the transmission of speech or primary data for a certain time interval, thus causing a decrease in the quality of transmitted speech or primary data, and transmitting secondary data stored in the buffer means until the end of said certain time interval; and means for inserting into each frame to be transmitted an identifier to indicate whether the frame contains a) speech or primary data, or b) secondary data.

11. A terminal device in accordance with claim 10, further comprising a data part and a data processing unit for transferring data between said buffer means and an external data processing device.

12. A network transmission device for transmitting secondary data alternating with speech or primary data on a circuit switched connection of a mobile communication system, which network transmission device includes means for discontinuous transmission of speech or primary data in frames, to continue the transmission of speech or primary data when it is indicated that there is no speech or primary data to be sent and continuing the transmission of speech or primary data when it is indicated that there is speech or primary data to be sent, the network transmission device comprising:

buffer means for temporarily storing secondary data to be transmitted;

means for transmitting secondary data in frames during the intervals when the transmission of speech or primary data is discontinued;

means for discontinuing the transmission of speech or primary data for a certain time interval, thus causing a decrease in quality of the transmitted speech or primary data, and transmitting secondary data stored in the buffer means until the end of said certain time interval; and means for inserting into each frame to be transmitted an identifier to indicate whether the frame contains a) speech or primary data or b) secondary data.

13. A terminal device for receiving secondary data alternating with speech or primary data on a circuit switched connection of a mobile communications system, which terminal device includes means for receiving discontinuous transmission of speech or primary data in frames, to continue the reception of speech or primary data when it is indicated that there is no speech or primary data to be received and continuing the reception of speech or primary data when it is indicated when there is speech or primary data to be received, the terminal device comprising:

means for discontinuing the reception of speech or primary data for a certain time interval;

means for receiving secondary data in frames during the intervals when the transmission of speech or primary data is discontinued;

a set of processing circuits for processing received speech or primary data;

buffer means for temporarily storing received secondary data;

means for reading from each received from an identifier to indicate whether the frame contains speech or primary data or whether the frame contains secondary data; and means for forwarding a received speech or primary data frame to said set of processing circuits when an identifier read from said frame indicates that the frame contains speech or primary data and for forwarding a received secondary data frame to said buffer means when an identifier read from said frame indicates that the frame contains secondary data.

14. A terminal device for receiving secondary data alternating with speech or primary data on a circuit switched connection of a mobile communications system, which terminal device includes means for receiving discontinuous transmission of speech or primary data in frames, to continue the reception of speech or primary data when it is indicated that there is no speech or primary data to be received and continuing the reception of speech or primary data when it is indicated when there is speech or primary data to be received, the terminal device comprising:

means for discontinuing the reception of speech or primary data for a certain time interval;

means for receiving secondary data in frames during the intervals when the transmission of speech or primary data is discontinued;

a set of processing circuits for processing received speech or primary data;

buffer means for temporarily storing received secondary data;

means for reading from each received from an identifier to indicate whether the frame contains speech or primary data or whether the frame contains secondary data;

means for forwarding a received speech or primary data frame to said set of processing circuits when an identifier read from said frame indicates that the frame contains speech or primary data, and for forwarding a received secondary data frame to said buffer means when an identifier read from said frame indicates that the frame contains secondary data; and further comprising means for transmitting received secondary data from said buffer means further to processing means external to the terminal device.

* * * * *